(12) United States Patent
Tsubouchi et al.

(10) Patent No.: US 6,333,925 B1
(45) Date of Patent: *Dec. 25, 2001

(54) CODE DIVISION MULTIPLEX COMMUNICATIONS SYSTEM

(75) Inventors: Kazuo Tsubouchi; Kazuya Masu; Yasuhito Fujita, all of Miyagi-ken (JP)

(73) Assignee: Clarion Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/024,934

(22) Filed: Feb. 17, 1998

(30) Foreign Application Priority Data

Feb. 17, 1997 (JP) .................................................... 9-032492

(51) Int. Cl.[7] .................................................. H04B 7/216
(52) U.S. Cl. ........................ 370/335; 370/342; 370/441; 375/142
(58) Field of Search ..................... 370/335, 342, 370/441; 375/130, 136, 140, 147, 150, 151, 142; 327/103

(56) References Cited

U.S. PATENT DOCUMENTS

| | | | |
|---|---|---|---|
| 3,643,230 | 2/1972 | Lynes | 377/77 |
| 4,164,628 | 8/1979 | Ward et al. | 375/150 |
| 4,363,976 | 12/1982 | Minor | 327/58 |
| 5,416,737 | 5/1995 | Lingstaedt et al. | 365/185.05 |
| 5,638,376 * | 6/1997 | Miki et al. | 370/342 |
| 5,793,794 * | 8/1998 | Kato et al. | 375/200 |
| 6,201,800 * | 3/2001 | Tsubouchi et al. | 370/342 |

FOREIGN PATENT DOCUMENTS 0 535 808 A2   4/1993 (EP) .

OTHER PUBLICATIONS

"Low Power Consumption Matched Filter LSI for Wideband", *Institute of Electronics, Information and Communication Engineers*, Technical Report of IEICE., Mamoru Sawahashi, et al., 1996, pp. 57–62 (with English translation).

* cited by examiner

*Primary Examiner*—Chau Nguyen
*Assistant Examiner*—Soon-Dong Hyun
(74) *Attorney, Agent, or Firm*—Brinks Hofer Gilson & Lione

(57) ABSTRACT

A code division multiplex communications system has a receiver for receiving a radio wave and transforming the radio wave to an electric signal. A voltage-current converter converts the electric signal to a current signal. A current delay mechanism then sequentially reads the electric signal during a clock pulse. Adders and subtractors manipulated output currents of the current delay mechanism in accordance with a spread code and a reproducing mechanism reproduces a transmission signal depending on the output of the adder and subtractor.

8 Claims, 9 Drawing Sheets

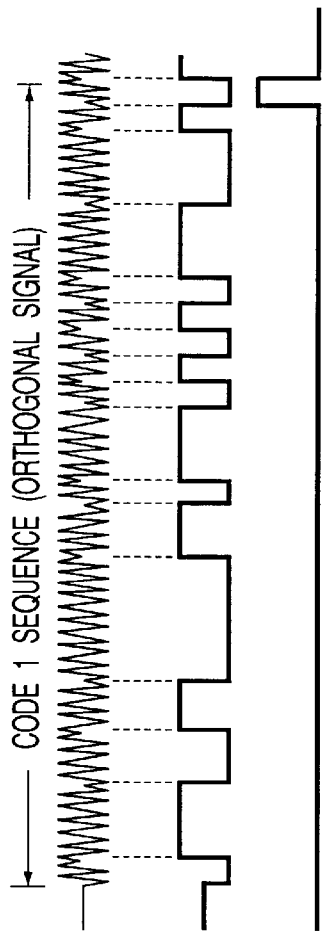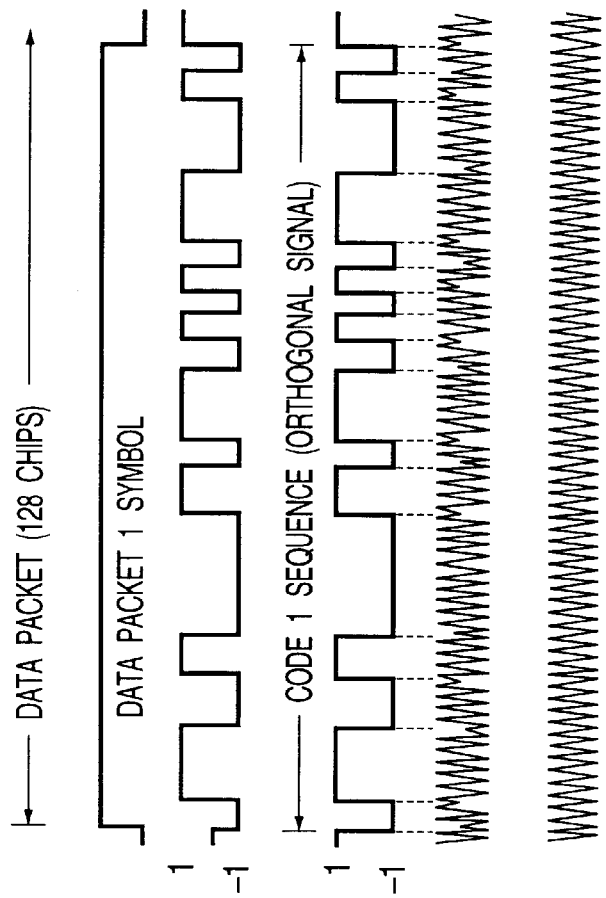

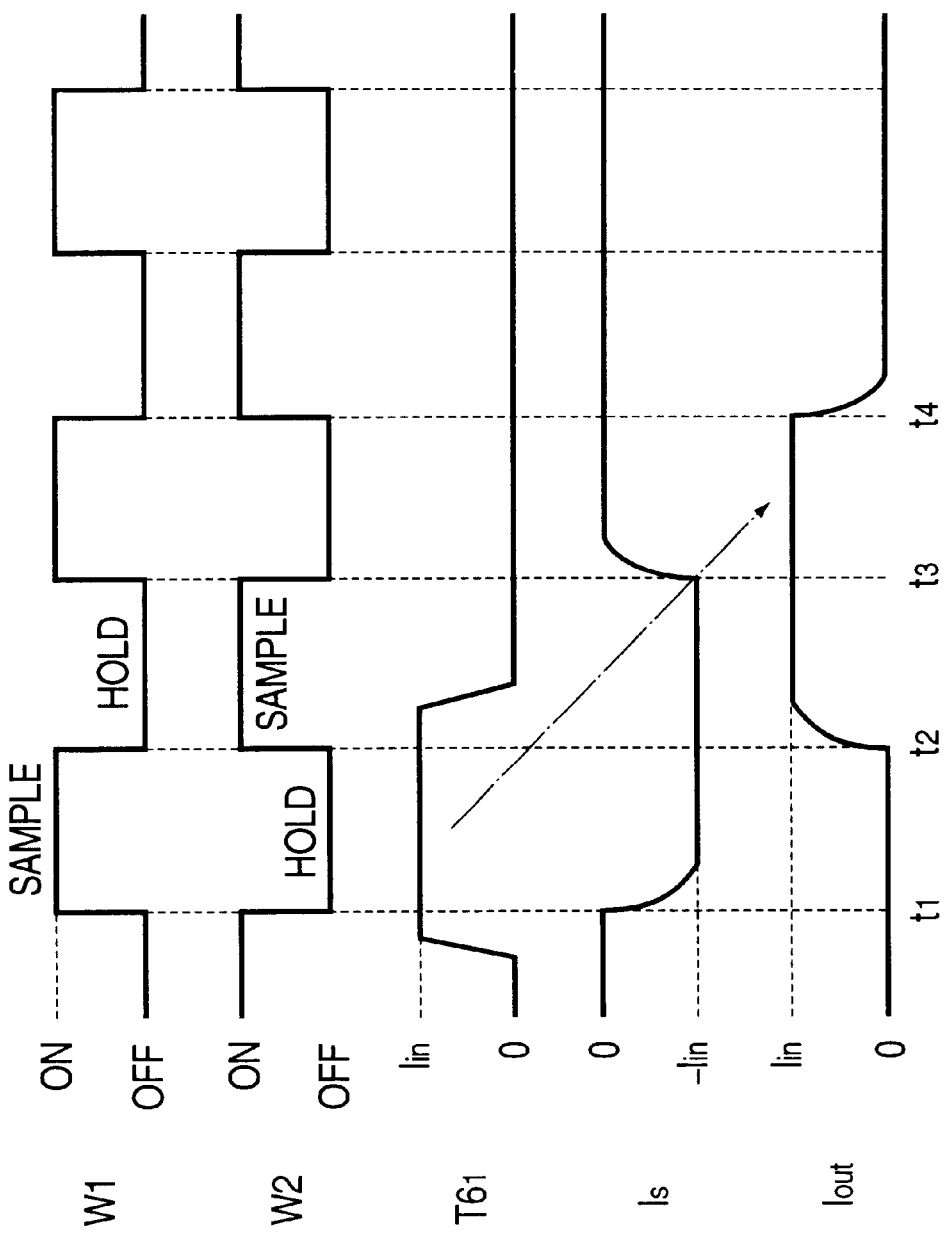

CODE DIVISION MULTIPLEX COMMUNICATIONS SYSTEM

BACKGROUND OF THE INVENTION

The present invention relates to spread spectrum communications and more particularly to a low power consumption code division multiplex communications system which can obtain synchronization at high speed.

While other multiplex communication systems (FDMA, TDMA) cannot permit more than a predetermined number of users, in a code division multiple access (CDMA), since the quality of communication gradually deteriorates (graceful degradation), users can be accepted as long as the code synchronization can be set so that increase in the number of users can be expected. The CDMA has excellent interference resistance, signal concealment, and fading resistance and is being used in a wide range.

According to the CDMA communications system, in a transmitter, baseband data to be transmitted is multiplied by a spread code and further by a carrier, and resultant data is transmitted from an antenna. In a receiver, a spread code having the same phase as that of the spread code at the time of transmission is prepared and the baseband data is decoded by using a correlator.

Hitherto, sliding correlator, SAW (Surface Acoustic Wave) matched filter, digital LSI matched filter, and the like are known as correlators.

According to the sliding correlator, the spread code is cycled faster than reception signal and a pull-in is performed by a discriminating circuit having a DLL (Delay Locked Loop) or the like. A signal obtained by eliminating carrier components by a sync detector or equivalent means, that is, of a frequency which is about the chip rate is inputted to the sliding correlator. The sliding correlator needs chip synchronization and has drawbacks that it takes time to capture synchronization and that the reception signal including carrier components cannot be inputted to the sliding correlator.

In the SAW matched filter, chip synchronization can be obtained at high speed. Although it can be also used in the RF and IF bands, there are drawbacks that since the spread code is decided by a physical pattern of an SAW device, it is difficult to change the code and the filter does not easily correspond to a long spread code.

In the digital LSI matched filter, the chip synchronization is unnecessary. Although there is an advantage that the spread code can be easily changed, there is a drawback of a large power consumption. In the digital LSI matched filter according to conventional CMOS integrated circuit techniques, since the operating speed is slow, there is a drawback that it can be generally used only in the baseband.

In recent years, a mobile communication (portable telephone and the like) is being widely spread. As a communication system employed by the mobile communication, attention has been paid most to the above-mentioned CDMA. It is desirable that the correlator of the CDMA used in the mobile communication is requested to satisfy all of the following requests.

a. To be able to correspond to a long spread code
b. To be operable also in the RF and IF bands
c. To have programmability of a spread code
d. To have small power consumption
e. To be of a matched filter system However, the above-mentioned conventional correlators cannot satisfy all of the requests.

Recently, a correlator using a switched capacitor system has been developed and is being put into practical use. The correlator is accomplished by further improving the digital LSI matched filter and has power consumption of about $\frac{1}{10}$ of that of the digital LSI matched filter. There are, however, drawbacks that the operating speed is slow (maximum 25 MHz) and the correlator cannot be used for matching in the RF and IF bands.

SUMMARY OF THE INVENTION

The invention has been made in consideration of the background and it is an object of the invention to provide a code division multiplex communications system which can correspond to a long spread code, operate in the RF and IF bands, and change the spread code easily, and further, has low power consumption.

According to the invention, there is provided a code division multiplex communications system comprising: receiving means for receiving a radio wave and transforming the radio wave to an electric signal; voltage-current converting means for converting the electric signal to a current signal; current delaying means for sequentially reading the electric signal at a timing of a clock pulse; adding and subtracting means for adding and subtracting output currents of the current delaying means in accordance with a spread code; and reproducing means for reproducing a transmission signal on the basis of an output of the adding and subtracting means.

Preferably, in the code division multiplex communications system, the receiving means receives the radio wave and transforming the received signal to an intermediate frequency signal.

Preferably, in the code division multiplex communications. system, the receiving means receives the radio wave and transforms the received radio wave to a baseband signal.

Preferably, in the code division multiplex communications system, the current delaying means is constructed by current flip-flops of the number twice as many as the number of chips of the spread code.

Preferably, in the code division multiplex communications system, the current flip-flop is constructed by serially connecting a first sample and hold circuit for sampling an input current at the leading edge of a first clock pulse and holding at the trailing edge of the first clock pulse and a second sample and hold circuit for sampling an input current at the leading edge of a second clock pulse and holding at the trailing edge of the second clock pulse.

Preferably, in the code division multiplex communications system, the adding and subtracting means comprises: spread code output means for outputting a spread code; switching means for connecting each output of the current delaying means to a first or second current path to perform current addition on the basis of the output of the spread code output means; and subtracting means for subtracting the current of the second current path from the current of the first current path.

Preferably, in the code division multiplex communications system, in the subtracting means is constructed by serially connecting first and second current mirror circuits, a current of the second current path is supplied to an input terminal of the first current mirror circuit, a current of the first current path is supplied to an output terminal of the first current mirror circuit and an input terminal of the second current mirror circuit, and an output is obtained from an output terminal of the second current mirror circuit.

Preferably, in the code division multiplex communications system, the reproduction means comprises: a current-voltage converter for converting an output of the adding and subtracting means to a voltage signal; and a demodulator for reproducing the transmission signal by integrating an output of the current-voltage converter.

BRIEF DESCRIPTION OF THE DRAWINGS

FIGS. 8A, 8B, and 8C, are timing diagrams showing the operation of the code division multiplex communications system according to the embodiment of the invention;

FIGS. 9A, ,9B, 9C, 9D, and 9E, are timing diagrams showing a transmission wave of a spread spectrum communication;

FIGS. 10A, 10B, 10C, 10D and 10E are timing diagrams showing the operation of the CDF/F in FIG. 4;

DETAILED DESCRIPTION OF THE PREFERRED EMBODIMENTS

(1) DESCRIPTION OF THE EMBODIMENTS

Figure 2:
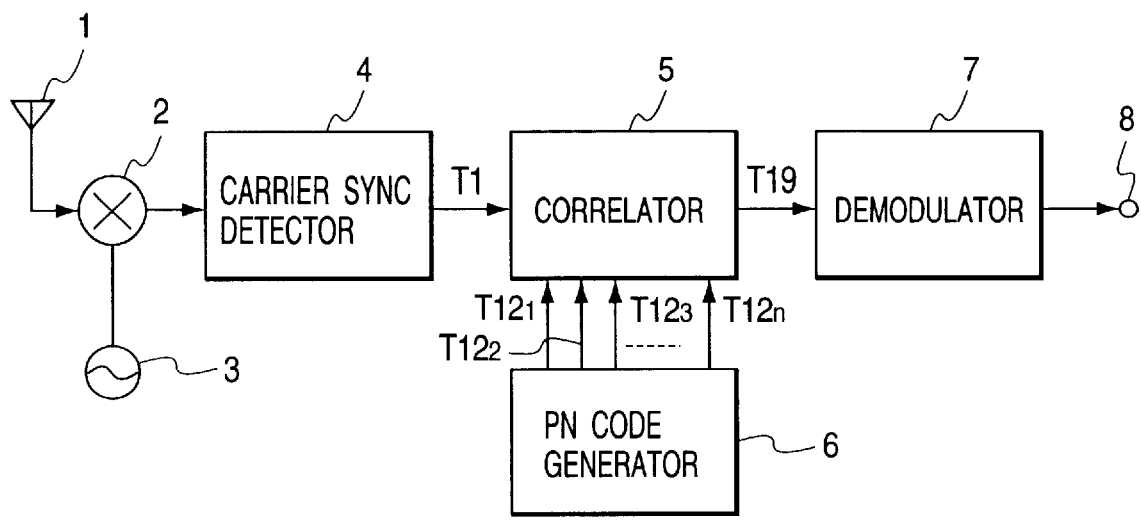
FIG. 2 is a block diagram showing the construction of the code division multiplex communications system according to an embodiment of the invention.

An embodiment of the invention will be described hereinbelow with reference to the drawings. FIG. 2 is a block diagram showing the construction of a code division multiplex communications system (receiving side) according to an embodiment of the invention. In the diagram, reference numeral 1 denotes an antenna for receiving waves transmitted from a transmitter which will be described hereinbelow; 2 a mixer for mixing the received transmission wave and a signal generated by a local oscillator 3 and generating an IF (intermediate frequency) signal; 4 a carrier synchronization detector for detecting synchronization of the outputs of the mixer 2; and 5 a correlator for obtaining the correlation between the PN code generated by a PN (Pseudo random Noise) code generator 6 and the output of the carrier sync detector 4 and generating a correlation signal. As PN codes, there are m-series code, Gold code, orthogonal series, orthogonal Gold series, orthogonal series formed from the Walsh function, and the like. Reference numeral 7 indicates a demodulator constructed by using an integrator and the like for demodulating baseband data on the basis of the output of the correlator 5.

Figure 1:
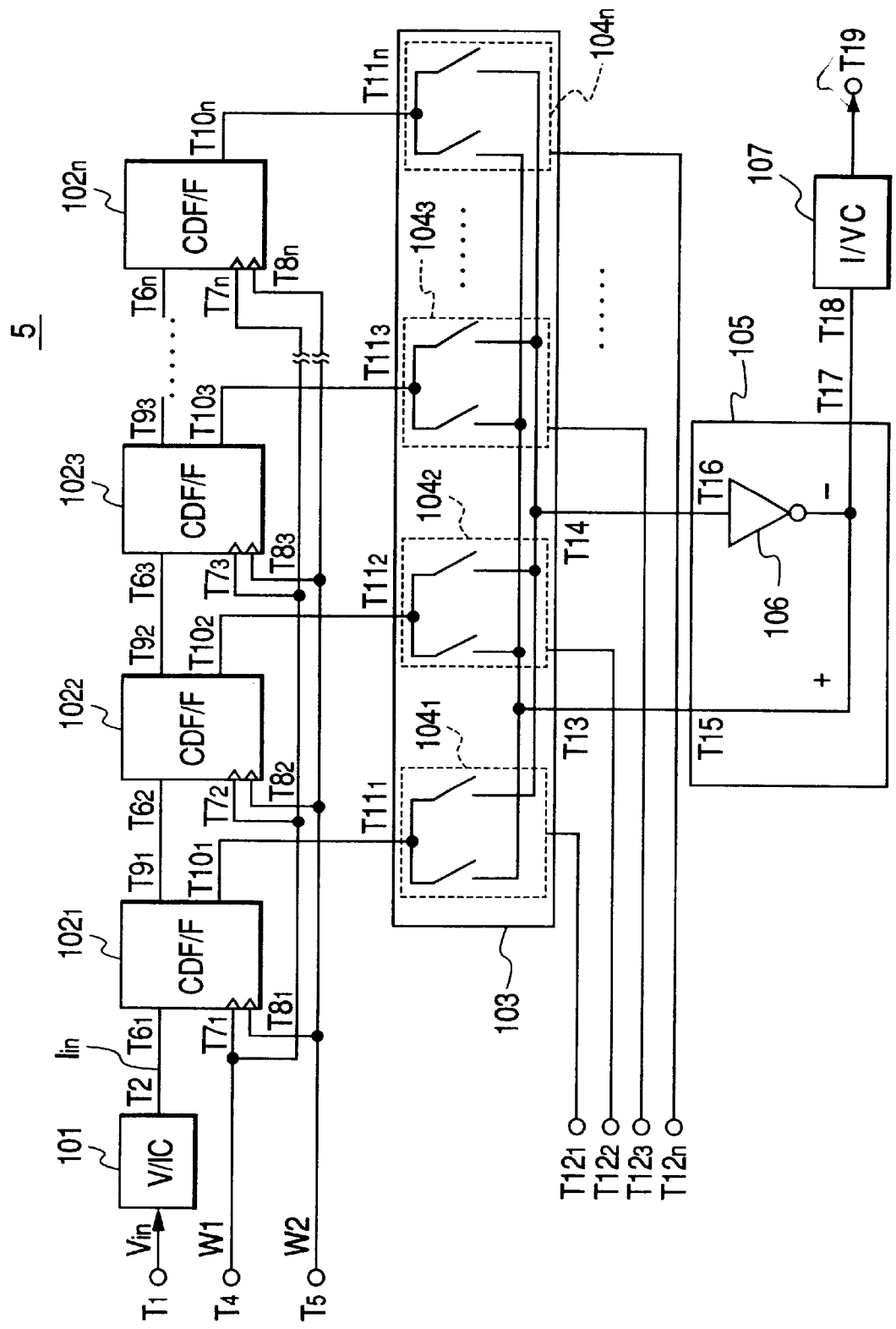
FIG. 1 is a block diagram showing the construction of a correlator in a code division multiplex communications system according to an embodiment of the invention.

The construction of the correlator 5 shown in FIG. 2 will be explained with reference to FIG. 1. The correlator 5 is different from a conventional correlator, uses a switched current method (switched current matched filter), and detects the correlation by current addition. In FIG. 1, reference numeral 101 denotes a V/IC (Voltage/Current Converter) for converting a voltage value of a signal Vin inputted from a terminal T1 to a current value Iin and outputting the current value Iin from a terminal T2.

Figure 3:
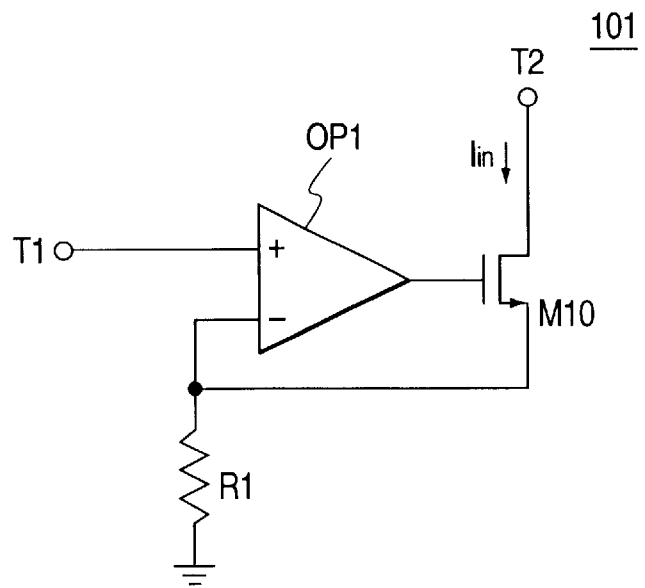
FIG. 3 is a circuit diagram showing the construction of a V/IC 101 in FIG. 1.

FIG. 3 is a diagram showing a construction example of the V/IC 101 in FIG. 1. In FIG. 3, OP1 denotes an operational amplifier for amplifying the voltage difference between the (−) terminal and the (+) terminal. The (+) terminal is connected to the terminal T1 and the (−) terminal is connected to the ground via a resistor R1. M10 shows an n-channel type MOS transistor which converts voltage into current and whose source is connected to the ground via the resistor R1. Its drain is connected to the terminal T2 and its gate is connected to an output terminal of the operational amplifier OP1. This construction relates to a so-called sink type V/I converter. A so-called source type V/I converter may be also used.

In FIG. 1, $102_1$, $102_2$, ..., $102_n$ (n is a natural number) denote CDF/Fs (Current Delay Flip/Flops) which sample and temporarily hold currents inputted from terminals $T6_1$ to $T6_n$ at timings of clock pulses inputted to terminals $T7_1$ to $T7_1$ and output from terminals $T9_1$ to $T9_{1n}$ and terminals $T10_1$ to $T10_n$ at timings of clock pulses inputted to terminals $T8_1$ to $T8_n$.

Figure 4:
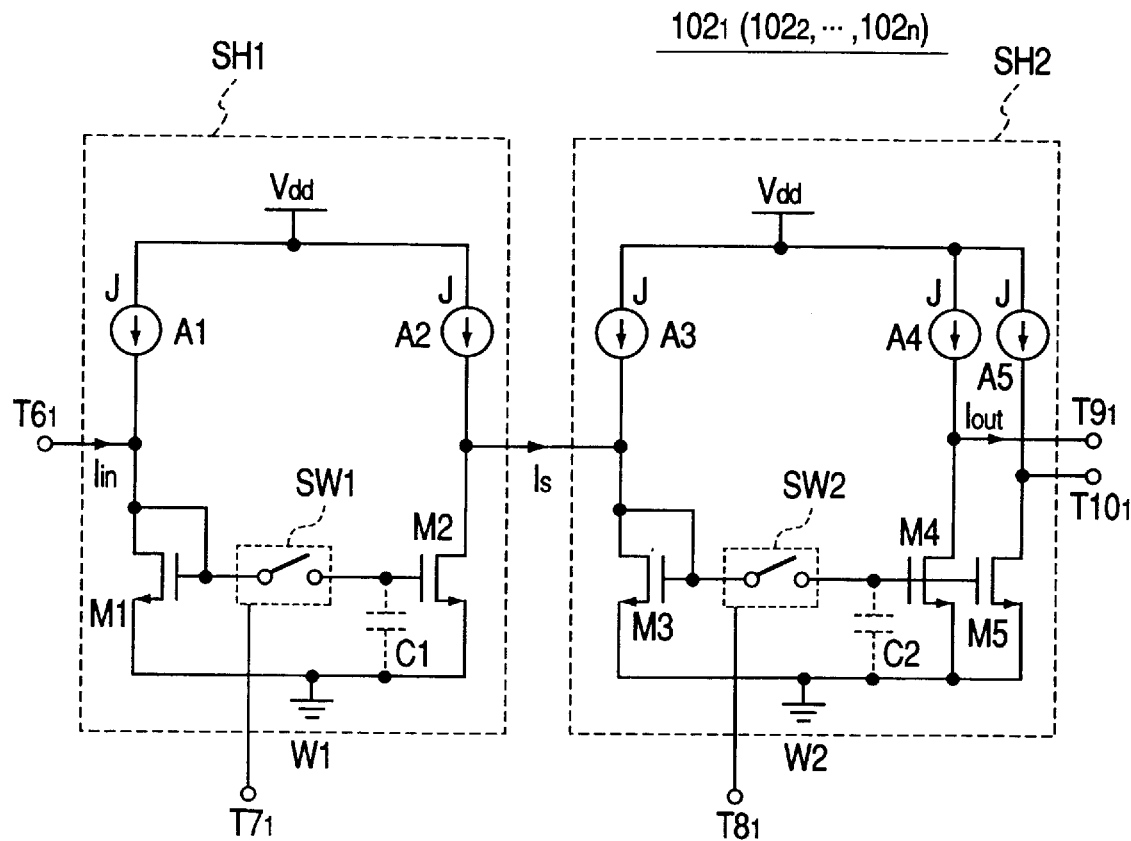
FIG. 4 is a circuit diagram showing the construction of a CDF/F $102_1$ in FIG. 1.

FIG. 4 is a diagram showing an example of the construction of the CDF/F $102_1$ in FIG. 1 (each of the CDF/Fs $102_2$ to $102_n$ has the same construction). The CDF/F $102_1$ is constructed by sample and hold circuits SH1 and SH2 for holding current. In the sample and hold circuit SH1, M1 denotes an n-type MOS transistor whose source is connected to the ground. Its drain is connected to a power source Vdd via a constant current source A1, its gate is connected to the drain, and the source is connected to the ground. Similarly, M2 is an n-type MOS transistor whose source is connected to the ground. Its drain is connected to the power source Vdd via a constant current source A2, its gate is connected to the gate of the n-type MOS transistor M1 via a switch SW1, and the source is connected to the ground.

The n-type MOS transistor is a so-called n-channel MOSFET. A p-type MOS transistor denotes a p-channel MOSFET. Each of those n-type MOS transistor and the p-type MOS transistor is an enhancement-type MOSFET in which a current hardly flows in the drain/source when a voltage is not applied to the gate. Although a depletion type MOSFET in which a current flows in the drain/source when no voltage is applied to the gate can be also used, there is a drawback that the operation characteristics shown in the embodiment cannot be obtained.

As a fundamental construction, in one sample and hold circuit, that is, in the sample and hold circuit SH1 in FIG. 4, current values of the constant current sources A1 and A2 are the same. The "ratio of the gate width to the gate length" in the n-type MOS transistor M1 and that of M2 are the same. In the sample and hold circuit SH2 in FIG. 4, the current values of constant current sources A3, A4, and A5 are the same. The "ratio of the gate width to the gate length" in each of n-type MOS transistors M3, M4, and M5 in the sample and hold circuit SH2 are the same. Consequently, an absolute value of the input current Iin in the sample and hold circuit SH1 and that of an output current Is in the sample and hold circuit SH1 are equal. An input current Is in SH2, an output current (Iout) from the terminal T91, and an output current from T10$_1$ are also equal. Each of switches SW1 and SW2 in FIG. 1 can be constructed by the n-type MOS transistor. When the power source voltage Vdd is applied to the gate, the drain/source of the n-type MOS transistor are made conductive (ON). When the gate voltage is zero, the source/drain are in a shut-off state (OFF). Similarly, each of switches SW11, SW12, SW21, and SW22 in FIG. 11 which will be described hereinbelow can be constructed by the n-type MOS transistor.

When the current values in a single CDF/F are equal as mentioned above, (n) CDF/Fs can be constructed by the same circuits, so that circuit designing is facilitated. Current values of the current sources and the "ratio of the gate width to the gate length" of each MOS transistor may be deliberately changed. In this case, since the input and output currents in the sample and hold circuits SH1 and SH2 are changed according to the current values of the current sources and "the ratio of the gate width to the gate length" of the MOS transistor, the circuit designing is complicated.

The switch SW1 is constructed by an MOS transistor and is turned on when a clock pulse W1 inputted from the terminal T7$_1$ is "1" and is turned off when the clock pulse W1 is "0". C1 denotes a parasitic capacitance between the gate and source of the n-type MOS transistor M2.

When the clock pulse W1 is "1", specifically, the voltage Vdd is applied. When the clock pulse W1 is "0", potential is zero. In the case where the switches SW1 and SW2 are constructed by the n-type MOS transistors, when the clock pulse W1 is "1", the switch SW1 is ON and when the clock pulse W1 is "0", the switch SW2 is OFF.

In the construction of the sample and hold circuit SH2, M3 denotes an n-type MOS transistor whose source is connected to the ground. Its drain is connected to the power source Vdd via the constant current source A3, its gate is connected to the drain, and the source is connected to the ground. M4 denotes the n-type MOS transistor whose source is connected to the ground. Its drain is connected to the power source Vdd via the constant current source A4, its gate is connected to the gate of the MOS transistor M3 via the switch SW2, and the source is connected to the ground. Similarly, M5 denotes the n-type MOS transistor whose source is connected to the ground. Its drain is connected to the power source Vdd via the constant current source A5, its gate is connected to the gate of the MOS transistor M4, and the source is connected to the ground.

The switch SW2 is turned on when a clock pulse W2 inputted from the terminal T8$_1$ is "1" and is turned off when the signal W2 is "0". The switch SW2 is constructed by an MOS transistor. C2 indicates a parasitic capacitance between the gate of the MOS transistor M4 and the gate of the MOS transistor M5.

The drain of the n-type MOS transistor M4 is connected to the terminal T9, and the drain of the n-type MOS transistor M5 is connected to the terminal T10$_1$. The drain of the n-type MOS transistor M2 and the drain of the n-type MOS transistor M3 are connected.

Reference numeral 103 in FIG. 1 denotes a switch circuit for switching current paths inputted to terminal T11$_1$ to T11$_n$ to a terminal T13 or T14 by signals inputted from terminals T12$_1$ to T12$_n$. The switch circuit 103 is constructed by analog switches 104$_1$, 104$_2$, ..., 104$_n$. PN codes generated by the PN code generator 6 (FIG. 2) are applied to the terminals T12$_1$ to T12$_n$.

Figure 5:
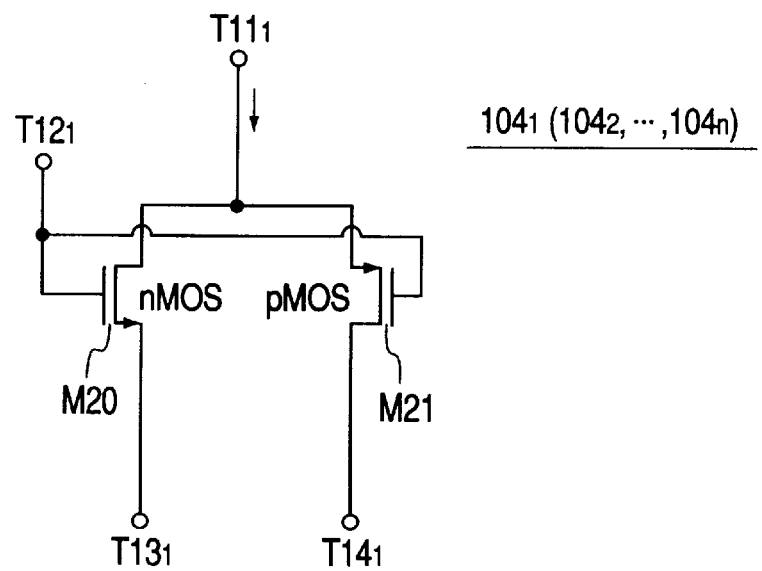
FIG. 5 is a circuit diagram showing the construction of an analog switch $104_1$ in FIG. 1.

FIG. 5 is a diagram showing the construction of the analog switch 104$_1$ (each of 1042 to 104$_n$ has the same construction) in FIG. 1. In FIG. 5, M20 denotes an n-type MOS transistor. Its drain is connected to the terminal T11$_1$, its source is connected to a terminal T13$_1$, and its gate is connected to the terminal T12$_1$. M21 indicates a p-type MOS transistor. Its drain is connected to the terminal T11$_1$, its source is connected to a terminal T14$_1$, and its gate is connected to the terminal T12$_1$.

Terminals T13$_1$ to T13$_n$ of the analog switches are commonly connected to T13 in FIG. 1. Terminals T14$_1$ to T14$_n$ of the analog switches are commonly connected to T14 in FIG. 1.

Reference numeral 105 in FIG. 1 denotes a current adder for adding a current flowing in the terminal T15 and a current obtained by inverting a current flowing in the terminal T16 by an inverting means 106 and outputting the result of addition to an output terminal T17. In other words, the current flowing in the terminal T16 is subtracted from the current flowing in the terminal T15 and the result is outputted to the output terminal T17.

Figure 6:
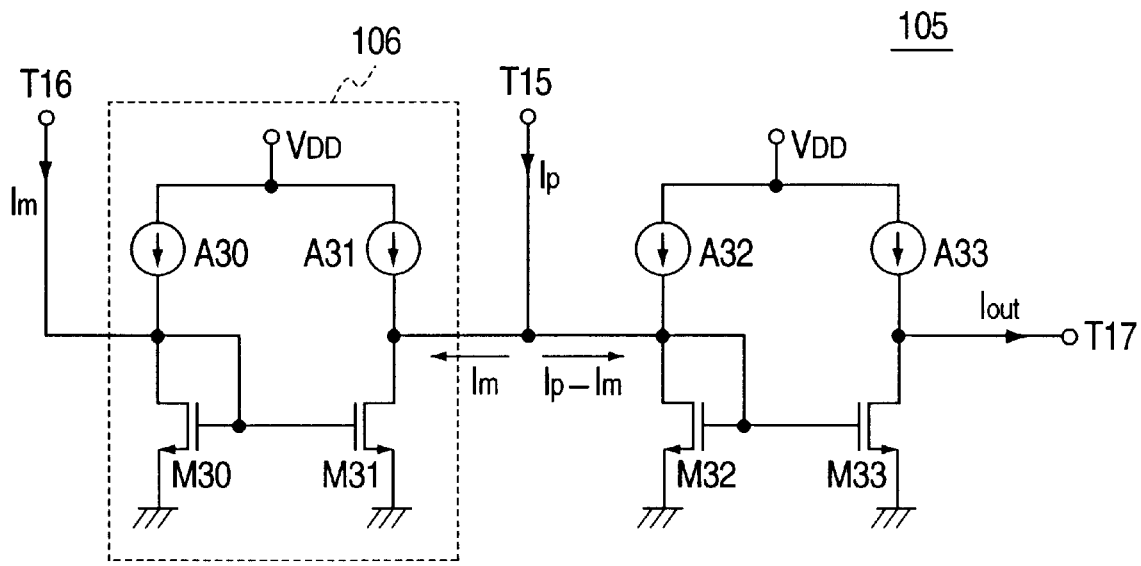
FIG. 6 is a circuit diagram showing the construction of a current adder 105 in FIG. 1.

FIG. 6 is a diagram showing an example of the construction of the current adder 105 in FIG. 1. In FIG. 6, M30 denotes an n-type MOS transistor whose source is connected to the ground. The drain is connected to the power source Vdd via a constant current source A30 and is connected to the terminal T16. The gate is connected to the drain and the source is connected to the ground. M31 denotes an n-type MOS transistor whose source is connected to the ground. Its drain is connected to the power source Vdd via a constant current source A31 and is connected to the terminal T15. Its gate is connected to the gate of the MOS transistor M30 and the source is connected to the ground.

M32 denotes an n-type MOS transistor whose source is connected to the ground. Its drain is connected to the power source Vdd via a constant current source A32 and is connected to the terminal T15. Its gate is connected to the drain and the source is connected to the ground. M33 indicates an n-type MOS transistor whose source is connected to the ground. Its drain is connected to the power source Vdd via a constant current source A33 and to the terminal T17. Its gate is connected to the gate of the n-type MOS transistor M32 and its source is connected to the ground. The current values of the constant current sources A30 to A33 are the same. The circuit constructed by the MOS transistors M30, M31 and the constant current sources A30, A31, and the circuit constructed by the MOS transistors M32, M33 and the constant current sources A32, A33 are current mirror circuits.

In a fundamental construction, the current values of the current sources A30 and A31 are equal and the "ratio of the gate width to the gate length" of the n-type MOS transistor M30 and that of M31 are equal. Similarly, the current values of the current sources A32 and A33 are equal and the "ratio of the gate width to the gate length" of the MOS transistor M32 and that of M33 are equal. With such a construction, the following operation is performed.

In the construction, assuming now that a current flowing from the terminal T16 is Im, a current flowing from the terminal T15 to the MOS transistor M31 is also Im. As a result, when it is assumed that the full current flowing from the terminal T15 is Ip, a current flowing from the terminal T15 to the MOS transistor M32 is (Ip−Im), and a current Iout flowing from the output terminal T17 to the outside is −(Ip−Im).

When the current values of the current sources A30 and A31, the "ratio of the gate width to the gate length" of the MOS transistor M30 and that of M31, the current values of the current sources A32 and A33, and the "ratio of the gate width to the gate length" of the n-type MOS transistor M32 and that of M33 are not equal respectively, an output current is generally "−(αIp−βIm)". Here, α and β are values determined by the current values of the current sources and the "ratio of the gate width to the gate length" of each n-type MOS transistor.

Figure 7:
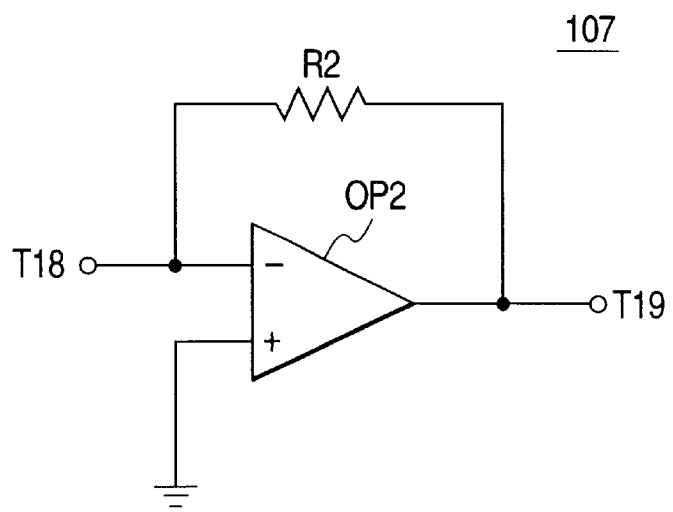
FIG. 7 is a circuit diagram showing the construction of a V/IC 107 in FIG. 1.

Reference numeral 107 in FIG. 1 denotes an I/VC (Current/Voltage Converter) for converting a current value inputted from the terminal T18 to a voltage value and outputting the voltage value from the terminal T19. FIG. 7 is a diagram showing an example of the construction of the I/VC 107. In FIG. 7, OP2 denotes an operational amplifier and R2 indicates a resistor interposed between the (−) terminal and the output terminal of the operational amplifier OP2.

Figure 14A:
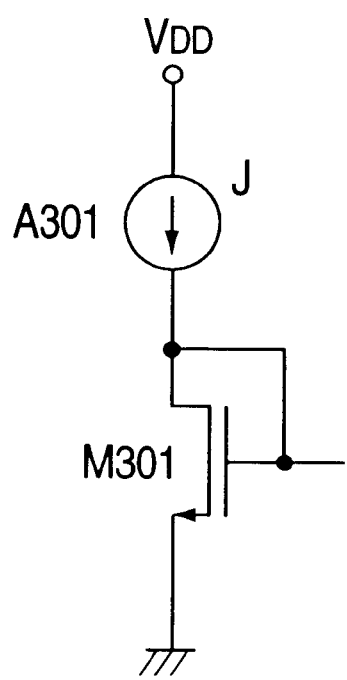
FIGS. 14A and 14B are circuit diagrams diagram specifically showing the construction of a current source in the embodiment.

In the above description, circuit codes are used as current sources. In an actual circuit, a current source having the construction shown in FIGS. 14A and 14B can be used. FIG. 14A shows a circuit portion including the current source in FIGS. 4, 6, and 11. In FIG. 14A, M301 denotes an n-type MOS transistor in which the source is connected to the ground, the gate and the drain are connected, and the drain is connected to the power source Vdd via a current source A301.

Figure 14B:
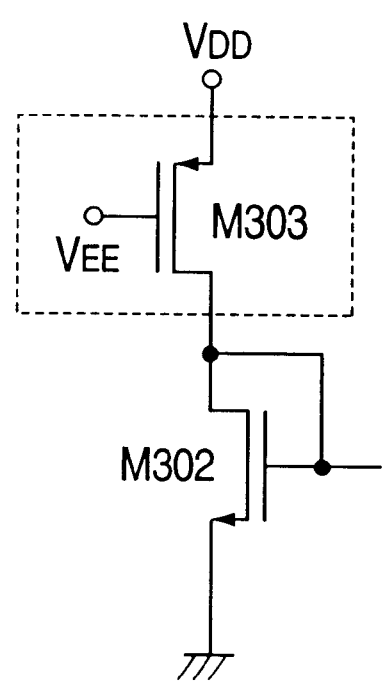

FIG. 14B is a diagram showing a specific circuit of the current source A301 shown in FIG. 14A. In FIG. 14B, M302 denotes an n-type MOS transistor having the same construction as that of the MOS transistor M301 shown in FIG. 14A. M303 indicates a p-type MOS transistor in which the drain is connected to the drain of M302 and the source is connected to Vdd. With such a construction, when a proper voltage VEE is applied to the gate of M303, the p-type MOS transistor M303 operates as a current source. A current J of the current source is determined by the "gate length", "ratio of the gate width to the gate length", and the gate voltage of the p-type MOS transistor. After the circuit is constructed, the value of the current J of the current source can be controlled by varying the gate voltage VEE.

The operation of the embodiment will be described hereinbelow with reference to FIGS. 1, 2, and 8. FIG. 8 is a diagram showing a process for demodulating a spread spectrum transmission wave. The antenna 1 in FIG. 2 receives the spread spectrum modulated transmission wave multiplied by a carrier wave. The received transmission wave shown in FIG. 8A will be described with reference to FIG. 9. FIG. 9 is a waveform chart for explaining the flow of the spread spectrum modulating process.

A data packet shown in FIG. 9 consists of 128 chips. In case of transmitting baseband data "1" shown in FIG. 9A, a PN code shown in FIG. 9B and the baseband data "1" are multiplied.

The PN code denotes a pseudo noise code. As the PN code, the m-series code, Gold code, orthogonal m-series code, orthogonal Gold code, and an orthogonal code formed from the Walsh function are known. Especially, the orthogonal code has the following characteristics. In the autocorrelation function, when the phase difference is zero, the correlation value is maximum. In the cross correlation function, when the phase difference is zero, the correlation value is zero. Since the orthogonal code has the characteristic, it can be said the orthogonal code is adapted to a channel division in the CDMA. The correlator 5 according to the embodiment can perform a correlating operation to any code by the signals of T12$_1$ to T12$_n$ applied to the switch matrix 103.

By multiplying the signal of FIG. 9C spread modulated by the multiplying process by a carrier wave shown in FIG. 9E, the spread spectrum transmission wave shown in FIG. 9D can be obtained.

In case of transmitting, for instance, baseband data "0", the spread modulated data has a waveform of a phase opposite to that of the waveform shown in FIG. 9C. The waveform of the phase opposite to that of FIG. 9C is multiplied by the carrier wave shown in FIG. 9E, thereby forming a transmission wave of data "0".

The transmission wave shown in FIG. 8A inputted from the antenna 1 in FIG. 2 is mixed with a signal of a frequency generated by the local oscillator 3 in the mixer 2, thereby obtaining the IF (intermediate frequency) signal of the frequency equal to the difference between the carrier wave and the signal. The IF signal is detected by the carrier sync detector 4 and is converted to a signal based on the PN code shown in FIG. 9B and the baseband data. The correlator 5 obtains the correlation between the output signal of the carrier sync detector 4 and the PN code generated by the PN code generator 6. The PN code generated by the PN code generator 6 and the PN code in the above-mentioned transmission are the same.

The operation of the correlator 5 shown in FIG. 1 will be described in detail. The spread modulated data (refer to FIG. 8B) outputted from the carrier sync detector 4 is inputted from the terminal T1 to the V/IC 101, converted to a current by the V/IC 101, and the current is sequentially supplied to the CDF/F 102$_1$. The current data outputted from the V/IC 101 is read while being sequentially shifted by the CDF/F 102$_1$ to CDF/F 102$_n$ on the basis of the clock pulses W1 and W2.

The operation of the CDF/Fs 102$_1$ to 102$_n$ will be described in detail with reference to FIGS. 4 and 10. FIG. 10 is a timing chart showing the operation of the CDF/F 102$_1$. The clock pulse W2 is a clock pulse whose phase is obtained by inverting the phase of the clock pulse W1. Generally, it is sufficient that the 1" state of the clock pulses W1 and W2 is not overlapped.

It is assumed that the current flowing from the V/IC 101 to the CDF/F 102$_1$ is the current Iin shown in FIG. 10C at a time point slightly before a time t1 shown in FIG. 10. The current Iin is supplied from the terminal T6$_1$ to the drain of the MOS transistor M1. When each current value of the constant current sources A1 to A5 is J, the value of the current flowing in the MOS transistor M1 is equal to (J+Iin).

When the clock pulse W1 shown in FIG. 10A becomes "1" and the clock pulse W2 shown in FIG. 10B becomes "0" at the time t1, the switch SW1 (FIG. 4) is closed, thereby short-circuiting the gate of the MOS transistor M1 and the gate of the MOS transistor M2. The switch SW2 is opened, so that the gate of the MOS transistor M3 and the gate of the MOS transistor M4 are electrically disconnected.

When the switch SW1 becomes "1", the MOS transistors M1 and M2 construct a current mirror circuit and the current (J+Iin) which is the same as that flows in the MOS transistor M1 flows in the MOS transistor M2. Consequently, the current Is (refer to FIG. 4) flowing from the drain side of the MOS transistor M2 to the drain side of the MOS transistor M3 is equal to −Iin (refer to FIG. 10D) and the current in the MOS transistor M3 is (J−Iin). The parasitic capacitance C1 between the gate and the source of the MOS transistor M2 is charged at this time. The above-mentioned steps relate to steps of current sampling.

When the clock pulse W1 becomes "0" and the clock pulse W2 becomes "1" at a time t2, the switch SW1 is opened and the gate of the MOS transistor M1 and the gate of the MOS transistor M2 are disconnected. In this instance, the current in the MOS transistor M2 is held by the parasitic capacitance C1 and the value of the current Is is accordingly held at −Iin. This is the current holding step.

On the other hand, when the switch SW2 is closed at the time t2, the gate of the MOS transistor M3 and the gates of the MOS transistors M4 and M5 are short-circuited. Consequently, the currents flowing in the MOS transistors M4 and M5 are equal to (J−Iin) which is the same current as that flows in the MOS transistor M3. As a result, the current Iout (FIG. 4) is equal to the current Iin as shown in FIG. 10E and the current Iout is outputted from the terminal $T9_1$. The current outputted from the terminal $T10_1$ is the same. At this time, parasitic capacitance C2 between the gate and the source of the MOS transistors M4 and M5 is charged.

When the clock pulse W1 becomes "1" and the clock pulse W2 becomes "0" at a time t3, next current data is read by the sample and hold circuit SH1. In this instance, although the switch SW2 becomes "0", the output current Iout is held by the parasitic capacitance C2.

The sampling and holding processes are sequentially executed, so that the current values corresponding to chip values of the PN code inputted to the terminal T1 are sequentially set in the CDF/Fs 1021 to 102n.

The currents outputted from the CDF/Fs 1021 to 102n are collected in the terminal T15 or T16 of the current adder 105 by the switch circuit 103. That is, the currents are added.

Assuming now that the number of CDF/Fs is 10 and the PN code is "1111110000", the output currents of the CDF/Fs $102_1$ to $102_6$ flow in the terminal T15 via the switch circuit 103 and the output currents of the CDF/Fs $102_7$ to $102_{10}$, flow in the terminal T16 via the switch circuit 103. Therefore, the current of the sum of the output currents of the CDF/Fs $102_1$ to $102_6$ flows in the terminal T15 and the current of the sum of the output currents of the CDF/Fs $102_7$ to $102_{10}$ flows in the terminal T16.

The current from the terminal T15 and the current obtained by inverting the current from the terminal T16 are added by the current adder 105 and the result is outputted from the terminal T17. According to the example, when the current data "1111110000" which is the same as that of the PN code is set in the CDF/Fs $102_1$ to $102_{10}$, the output current of the current adder 105 reaches a peak value (refer to FIG. 8C). Thus, a peak voltage is outputted from the I/VC 107.

The correlator 5 in FIG. 1 outputs a positive peak value when the data of the same phase as that of the PN code generated from the PN code generator 6 (FIG. 2) is set in the CDF/Fs $102_1$ to $102_n$. The correlator 5 outputs a negative peak value when the data of the opposite phase is set. That is, the positive peak is outputted when the PN spread modulated baseband data "1" is received by the CDF/Fs $102_1$ to 102n and the negative peak is outputted when the baseband data "0" is received. The peak value is integrated by the demodulator 7 (FIG. 2), thereby obtaining the original baseband data.

(2) Effects of the embodiment

The current adding type correlator 5 according to the foregoing embodiment can obtain remarkable effects of simplicity of circuit, high speed, and low power consumption as compared with a conventional CMOS·LSI digital matched filter using an Si process. The result of comparison of them based on computer simulation will be shown below.

| | CMOS·LSI digital matched filter (128 chips·7 bits) | Current adding type correlator (128 chips·S/N 40 dB) |
|---|---|---|
| (1) The number of transistors | | |
| adding part | 75,770 | 8*[1] |
| delaying part | 50,176 | 3,584*[2] |
| Total | 125,946 | 3,592 |
| (2) Maximum operating frequency | 100 MHz | 4.46 GHz |
| (3) Power consumption | 180 mW (100 MHz) | 202 mW (4.46 GHz) |

*[1]adding part . . . the current adder 105
*[2]delaying part . . . the CDF/Fs $102_1$ to $102_n$ and the switch circuit 103

With respect to the CMOS·LSI digital matched filter, (128 chips·7 bits) denotes that the code length of the PN code is 128 chips and the number of quantization bits of the A/D converter at the front stage of the CMOS digital matched filter is seven. As for sampling, the double sampling is performed. That is, an input signal to the matched filter is sampled at a frequency twice as high as the chip rate. The maximum operating frequency of the CMOS·LSI digital matched filter is 100 MHz.

It means that a correlating operation can be performed to a reception signal of 50 Mcps (mega chip per second) as a chip rate. The power consumption of the CMOS·LSI digital matched filter is power consumption when it is operated with a power voltage of 1.8 V and a clock of 100 MHz. The power consumption increases in proportional to the operating clock frequency. The maximum operating frequency and the power consumption are values of a circuit when a CMOS process of a design rule 0.2 $\mu$m is used.

Here, (128 chips·S/N 40 ds) of the current adding type correlator denotes that the code length of the PN code is 128 chips. The double sampling is employed. That is, an input signal to the matched filter is sampled at a frequency twice as high as the chip rate. The maximum operating frequency of the current adding type correlator is 4.46 GHz, which is the cut off frequency of the circuit and corresponds to the maximum operating clock frequency.

Since the double sampling is performed, the chip rate of the maximum operation is 2.23 Gcps which is the half of 4.46 GHz. It denotes that a correlating operation can be performed to a reception signal of 50 Mcps (mega chip per second) as a chip rate. In case of the current adding type correlator, the power consumption is a constant value which does not depend on the operating clock frequency of the correlator. The operating frequency and the power consumption are values when the CMOS process of the design rule of 0.2 $\mu$m is used and the operating power source voltage is 1.0V.

As mentioned above, in the correlator according to the embodiment, the number of transistors can be largely reduced as compared with a conventional CMOS·LS I matched filter. As a result, the chip area of the LSI can be reduced when the LSI is formed, so that the costs can be lowered. In the conventional matched filter, many transistors are necessary especially in the adding part. The operating speed can be consequently increased only to 100 MHz so that matching in the RF and IF bands cannot be performed. On the contrary, since the correlator of the embodiment uses the current adding method, the circuit of the adding part is extremely simple. The high operating speed of 4.46 GHz can be consequently obtained and the matching in the RF and IF bands can be realized.

In the conventional matched filter, the higher the operating frequency is, the larger the power consumption is. When it is assumed that the filter operates at a clock frequency of 1 GHz, the power consumption is as high as 1.8W. On the contrary, since the correlator of the embodiment uses the current adding method, the power consumption does not change according to the frequency and there is an advantage that the power consumption of 200 mW is sufficient even when the correlator operates at 4 GHz or higher. The correlator according to the embodiment has also an advantage that it can be manufactured in an LSI form by a standard LSI process.

Although a capacitance of a very strict value has to be used in an LSI process of an analog matched filter using a switched capacitance, all of the circuits of the current adding type matched filter can be fabricated by using the standard Si process which is usually supplied by a so-called ASIC vender.

(3) Another embodiment

Figure 11:
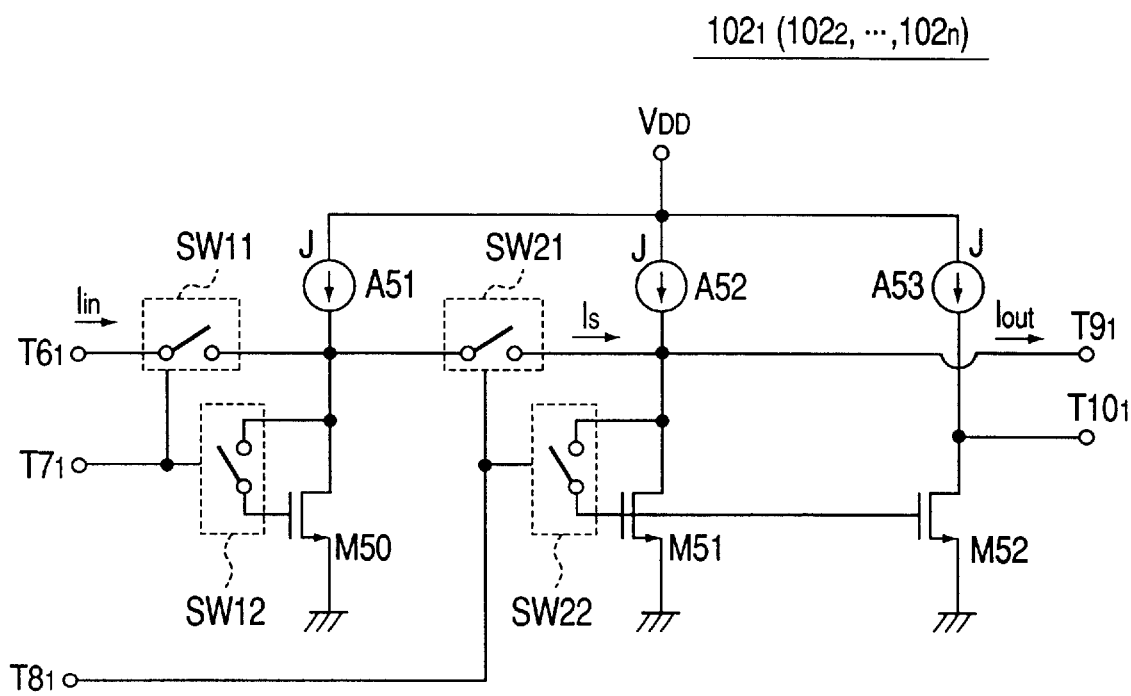
FIG. 11 is a circuit diagram showing another construction of the CDF/F in FIG. 1.

FIG. 11 is a circuit diagram showing another construction example of the CDF/Fs $102_1$ to $102n$ in FIG. 1. In FIG. 11, M50 denotes an n-type MOS transistor in which the source is connected to the ground. The drain is connected to the power source Vdd via the constant current source A51 and the gate is connected to the drain via the switch SW12. The drain of the n-type MOS transistor M50 is connected to the terminal $T6_1$ via the switch SW11.

M51 denotes an n-type MOS transistor whose source is connected to the ground. The drain is connected to the power source Vdd via the constant current source A52 and the gate is connected to the drain via the switch SW22. The drain of the n-type MOS transistor M51 is connected to the drain of the n-type MOS transistor M50 and to the terminal T91 via the switch SW21.

M52 denotes an n-type MOS transistor whose source is connected to the ground. The drain is connected to the power source Vdd via the constant current source A53, and the gate is connected to the gate of the n-type MOS transistor M51. The drain of the n-type MOS transistor is connected to the terminal $T10_1$.

Figures 13A, 13B, 13C, 13D, 13E:
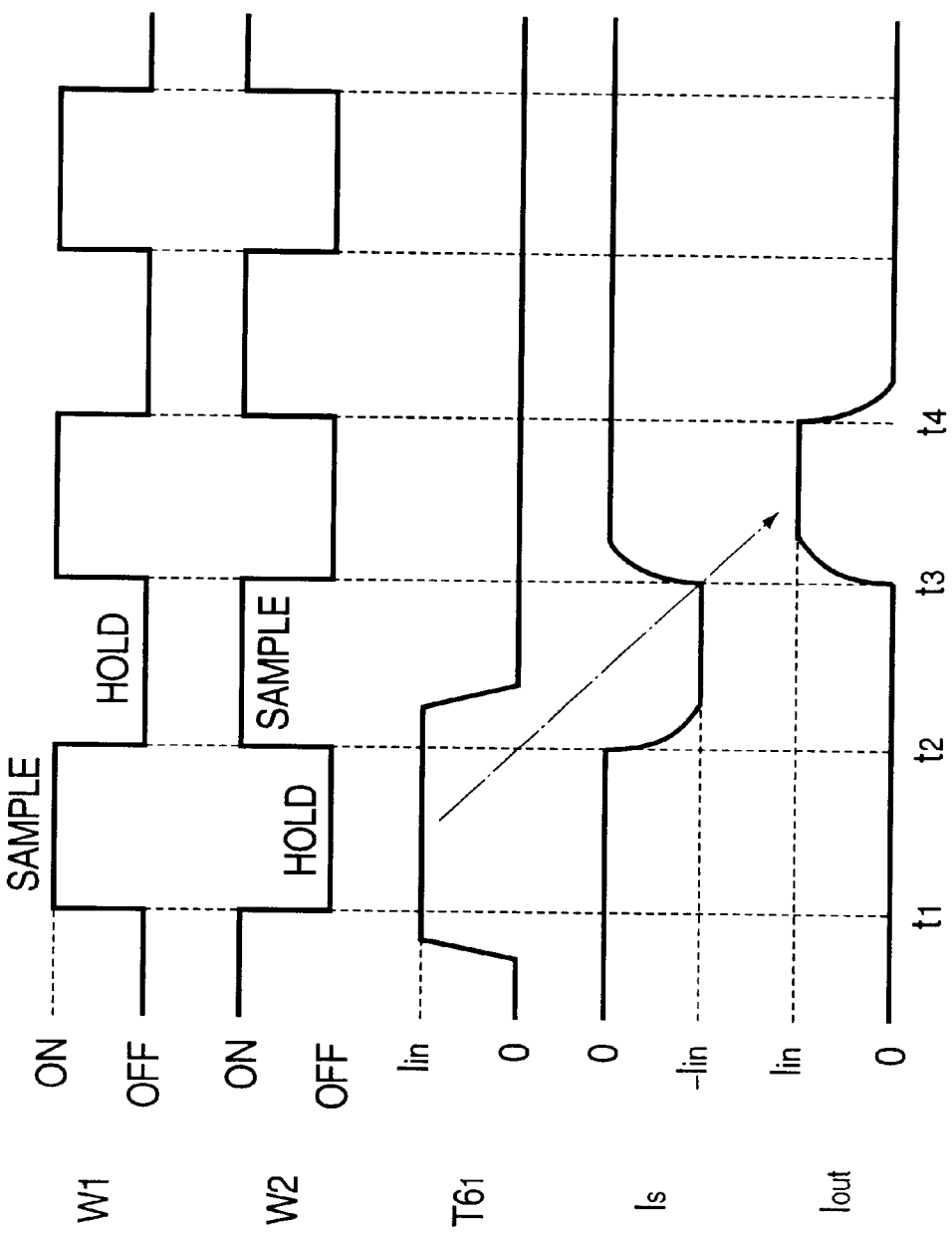
FIGS. 13A, 13B, 13C, 13D and 13E are timing diagrams showing the operation of the CDF/F illustrated in FIG. 4.

The operation of the CDF/F shown in FIG. 11 will be described with reference to FIG. 13. It is assumed that the current in each of the constant current sources A51 to A53 is J. When the clock pulse W1 shown in FIG. 13A becomes "1" and the clock pulse W2 shown in FIG. 13B becomes "0" at a time t1, the switches SW11 and SW12 are closed and the current Iin shown in FIG. 13C inputted from the terminal $T6_1$ is supplied to the drain of the n-type MOS transistor M50.

The current flowing in the n-type MOS transistor M50 is equal to (J+Iin) which is the sum of the current supplied from the constant current source A51 and the current Iin.

When the clock pulse W1 becomes "0" and the clock pulse W2 becomes "1" at a time t2, the switches SW11 and SW12 are opened and the switches SW21 and SW22 are closed.

The current of the n-type MOS transistor M50 is held at (J+Iin) by the parasitic capacitance of the gate/source of the n-type MOS transistor M50. The current Is is accordingly –Iin. As a result, the current in the n-type MOS transistor M51 is (J–Iin). Similarly, the current of the n-type MOS transistor M52 is (J–Iin).

When the clock pulse W1 becomes "1" and the clock pulse W2 becomes "0" at a time t3, the switches SW11 and SW12 are again closed and the switches SW21 and SW22 are opened. In this instance, the current (J–Iin) of the MOS transistors M51 and M52 is held by the parasitic capacitance between the gate and the source. As a result, the current Iin flows as the current Iout from the constant current source A52 to the terminal T91. At this time, similarly, the current Iin flows from the drain of the MOS transistor M52 to the terminal $T10_1$.

According to the circuit of FIG. 11, the number of constant current sources can be reduced as compared with the circuit of FIG. 4.

Figure 12:
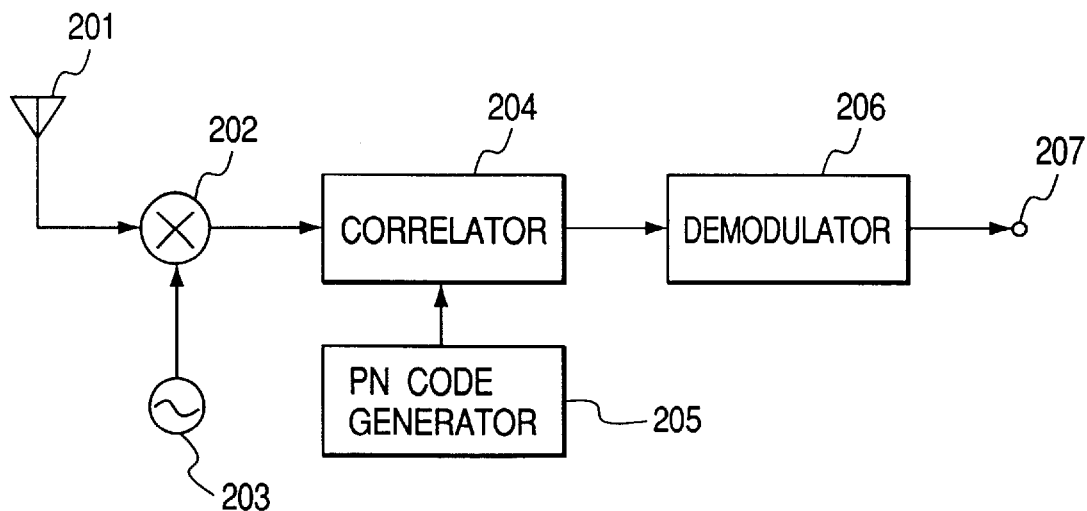
FIG. 12 is a block diagram showing the construction of a code division multiplex communications system according to a second embodiment of the invention.

FIG. 12 is a block diagram showing the construction of a code division multiplex communications system (receiving side) according to another embodiment of the invention. In FIG. 12, reference numeral 201 denotes an antenna for receiving a transmission wave from a transmitter (not shown); 202 a mixer for mixing the received transmission wave and a signal wave oscillated by the local oscillator 3 and outputting an IF signal; 204 a correlator having the construction similar to that of the correlator 5 shown in FIG. 1 for obtaining the correlation between the PN code generated by a programmable PN code generator 205 and the IF signal and outputting a correlation signal; and 206 a demodulator for reproducing a baseband signal on the basis of the inputted correlation signal.

A digital correlator can be also constructed in such a manner that (M) correlators 5 shown in FIG. 2 are arranged in parallel, an A/D converter of (M) quantization bits is connected before the terminal Ti and a D/A converter of (M) bits is connected after the terminal T19.

When the correlator is used in the IF (Intermediate Frequency) band as shown in FIG. 12, the designing is performed as follows. The number of CDF/Fs and the operating clock frequency have to be considered. When the IF frequency is fIF, the chip length is N, the chip rate is Cchip, and the sampling coefficient is Ms, the following is given.

[the number of CDF/Fs]=(N×fIF×Ms)÷Cchip

The sampling coefficient Ms is equal to 2 in the event of double sampling. When the IF frequency (fIF) is 200 MHz, the chip length (N) is 128, the chip rate (Cchip) is 50 Mcps, and the double sampling (Ms=2) is performed, the number of the CDF/Fs is derived by:

(128×200[MHz]×2)÷50[Mcps]=1024

In this case, since the double sampling is performed, the sampling frequency has to be 400 MHz which is double of 200 MHz. The clock frequency of the maximum operation of the current adding type correlator according to the invention is controlled by the operating speed of each CDF/F. The adding circuit does not exert an influence on the operating frequency even when the number of stages of the CDF/Fs increases. Consequently, when the number of CDF/Fs increases to 1,024, the high speed operation up to 4.46 GHz can be performed. The sampling at 400 MHz is therefore possible. On the other hand, in a conventional CMOS·LS I digital matched filter, even if 0.2 μm process is used, the speed is controlled in the adding circuit, so that sampling can be performed at most about 100 MHz.

As mentioned above, according to the invention, the following effects can be obtained.
(1) The invention can correspond to a long spread code.
(2) The invention can easily change the spread code and has excellent programmability.
(3) The invention has high operating speed and can also operate in the RF and IF bands.
(4) The invention has small power consumption, so that it is suitable as a portable terminal.

(5) Any special process is unnecessary to form an LSI and an LSI can be manufactured by a standard Si process.

What is claimed is:

1. A code division multiplex communications system comprising:

receiving means for receiving a radio wave and transforming the radio wave to an electric signal;

voltage-current converting means for converting the electric signal to a current signal;

current delaying means for sequentially reading the electric signal at a timing of a clock pulse;

adding and subtracting means for adding and subtracting output currents of the current delaying means in accordance with a spread code; and reproducing means for reproducing a transmission signal on the basis of an output of the adding and subtracting means.

2. The system according to claim 1, wherein the receiving means receives the radio wave and transforms the received signal to an intermediate frequency signal.

3. The system according to claim 1, wherein the receiving means receives the radio wave and transforms the received radio wave to a baseband signal.

4. The system according to claim 1, wherein the current delaying means is constructed by current flip-flops of the number twice as many as the number of chips of the spread code.

5. The system according to claim 4, wherein the current flip flop is constructed by serially connecting a first sample and hold circuit for sampling an input current at the leading edge of a first clock pulse and holding at the trailing edge of the first clock pulse and a second sample and hold circuit for sampling an input current at the leading edge of a second clock pulse and holding at the trailing edge of the second clock pulse.

6. The system according to claim 1, wherein the adding and subtracting means comprises: spread code output means for outputting the spread code; switching means for connecting each output of the current delaying means to a first or second current path for addition of currents on the basis of an output of the spread code output means; and subtracting means for subtracting the current of the second current path from the current of the first current path.

7. The system according to claim 6, wherein in the subtracting means, first and second current mirror circuits are connected in series, a current of the second current path is supplied to an input terminal of the first current mirror circuit, a current of the first current path is supplied to an output terminal of the first current mirror circuit and an input terminal of the second current mirror circuit, and an output is obtained from an output terminal of the second current mirror circuit.

8. The system according to claim 1, wherein the reproducing means comprises:

a current-voltage converter for converting on output of the adding and subtracting means to a voltage signal; and a demodulator for reproducing the transmission signal by integrating an output of the current-voltage converter.

* * * * *